Patented Nov. 21, 1922.

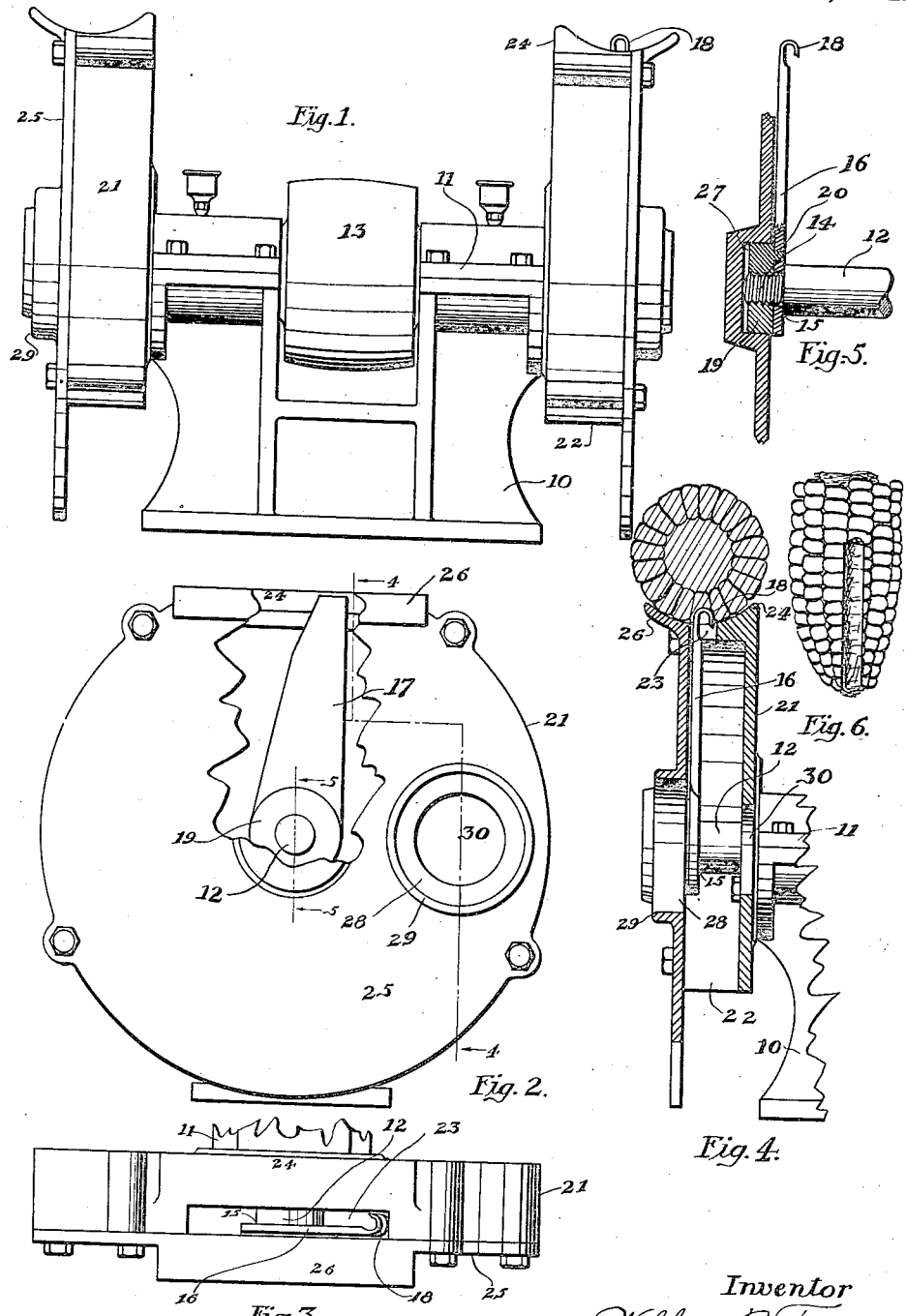

1,436,162

UNITED STATES PATENT OFFICE.

WILBUR B. FOWLER, OF DES MOINES, IOWA.

CORN TRIMMER.

Application filed December 30, 1920. Serial No. 434,086.

*To all whom it may concern:*

Be it known that I, WILBUR B. FOWLER, a citizen of the United States, and resident of Des Moines, in the county of Polk and State of Iowa, have invented a certain new and useful Corn Trimmer, of which the following is a specification.

The object of my invention is to provide mechanical means for trimming worm eaten portions from the ears of green corn.

A further object is to provide a corn trimmer of simple, durable and inexpensive construction, having means whereby a single knife may be employed to sever the entire end of an ear by placing it in one position relative to the cutter, and may also be employed to cut a groove for removing the worm eaten portion by placing it in another position relative to the cutter.

A further object is to provide in a corn trimmer, new and improved means for securing the cutter blade to the driving shaft.

These and other objects will be apparent to those skilled in the art, and need not be mentioned in detail.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved trimmer.

Figure 2 is a side elevation of the same with a portion of the side plate broken away to show the cutter member.

Figure 3 is a detail plan view of one of the casings in which the cutter operates.

Figure 4 shows a vertical sectional view, taken on the line 4—4 of Figure 2, showing in section a portion of an ear of corn in an operative position.

Figure 5 is a detail sectional view showing the manner in which the knives are mounted on the operating shaft; and Figure 6 is a perspective view of one end of an ear of corn, showing the manner in which the worm eaten portion is removed.

My improved corn trimmer comprises a supporting base 10 provided with spaced bearings 11 in which is rotatably mounted a shaft 12. A pulley 13 is secured to said shaft between the bearings 11. Each end of the shaft 12 is formed with a screw-threaded portion 14 of smaller diameter than the shaft, so as to provide shoulders 15. Each of the portions 14 is designed to receive a cutter blade 16, one edge of which is sharpened at 17, while its free end is formed with a semi-circular curved portion 18, the blade being drawn thin at said curved portion, the forward edge of the curved portion also being sharpened and extended inwardly.

For securing the blade 16 in position on the shaft 12, I have provided a circular nut 19 which is screw-threaded and designed to coact with the member 14, and which is also provided with a pin 20. The pin 20 is designed to enter an opening in the blade 18 to prevent rotation between said blade and said nut. The member 14 is so threaded that when the blade 16 and the nut 19 are placed in position thereon and rotated in a direction opposite from that in which the shaft 12 is designed to rotate, the blade 16 will be moved against the shoulder 15 and thereby locked in position relative to said shaft.

When it is desired to remove the blade from the end of the shaft, the operator simply moves the blade in the direction the shaft is designed to rotate, which will loosen the nut 19 and permit the blade to be easily and quickly removed.

Adjacent to the outer end of each of the bearings 11 I have provided a circular casing 21 having an opening 22 at its bottom and a slot 23 in its upper portion. The said upper portion is provided with a horizontal portion 24, the upper face of which is slightly concave. The distance from the concave face and the center of the shaft is slightly less than the distance between the center of the shaft and the extreme end of the cutter member 16, the slot 23 being so arranged that the portion 18 of the cutter 16 will travel through said slot as the cutter is rotated.

The front side of each of the casings 21 is open and designed to receive a cover plate 25, the said cover plate being substantially circular with the exception of its top, which is provided with a flattened portion 26 slightly concave in the opposite direction from the face 24, so that the two said concave faces form a trough in which an ear of corn may rest in an operative position. The plate 25 is designed to lie adjacent to the cutter 16, and is provided at its central portion with a recess 27 of a diameter slightly greater than the nut 19, which is designed to be rotatably mounted therein, and of a depth slightly greater than the width of the nut.

The shaft 12 is of such a length that when the plates 21 are in position the ends of the shaft will engage the bottom portions of the recesses 27, so that longitudinal movement of the shaft 12 will be prevented, so that the blades 16 may rotate very close to the plates 25 without actually engaging them.

Each of the plates 25 is provided with a circular opening 28 having a downwardly extending flange 29. This opening is for the purpose of receiving an ear of corn which may be moved through said opening and transversely into the path of the cutting member 16, so that the entire end of the ear may be cut off. Sometimes it is desirable to cut the stem of the butt portion of the ear off. This is accomplished by placing the stem end of the ear through the opening 25, the stem being permitted to pass through an opening 30 in the back of said casing.

In practical operation and assuming that the pulley 13 has been connected to a suitable belt and the knives 16 are rotated in a clockwise direction, as shown in Figure 2, the operator grasps an ear of corn and examines it, and if he finds that the small end of the ear is badly eaten or otherwise spoiled, he places the spoiled portion of the ear through the opening 28 so that the said ear rests on the flange 29, and thrusts the ear transversely into the opening, and the spoiled portion of the ear is severed by means of the forward edges of the member 16. Again he may find, and this is usually the case, that the worm eaten portion consists in nothing more or less than a narrow groove extending longitudinally down one row of kernels. In this case the operator places the ear of corn in the concave portion of the casing, with the worm eaten portion of the ear in line with the slot 23, so that the curved portion 18 of the cutter will cut away the spoiled portion of the ear and leave a slot similar to that shown in Figure 6 of the drawings.

This accomplishes a great saving over the old method of trimming the spoiled portions, which consists in either cutting off the entire end of the ear or cutting off the spoiled portion with a single cut of an ordinary knife, which also cuts away a large amount of good corn.

It will therefore be seen that I have provided a corn cutter of very simple, durable and inexpensive construction, which is especially adapted to economically trim the spoiled portions of ears of green corn, and one in which the cutting blades may be easily and quickly removed for sharpening or otherwise repairing, by simply removing the plates 25 and rotating the blade in the same direction in which the shaft operates. This is usually accomplished by striking the back side of the blade with an ear of corn, which will cause it to be loosened, after which the blade may be quickly removed and a new one put in position.

A further advantage of my trimmer lies in the fact that the entire end of the ear may be severed, or a very small groove cut out, by means of a single operating knife and by placing the ear in either one of two positions which are very convenient to the operator, and this may be accomplished without any operation of mechanism.

I claim as my invention:

1. In a device of the class described, a support, a shaft rotatably mounted therein, a radial cutter blade on said shaft having its peripheral end bent laterally to a semi-circular shape, and means for supporting an ear of corn tangentially and longitudinally in the path of the curved portion of said blade.

2. In a device of the class described, a support, a shaft rotatably mounted therein, a radial cutter blade on said shaft having its peripheral end bent laterally to a semi-circular shape, and means for supporting an ear of corn in the path of the curved portion of said cutter.

3. In a device of the class described, a support, a shaft rotatably mounted therein, a cutter on each end of said shaft, having a radial and a curved peripheral cutter member, and a casing for each of said cutters, open at its bottom and provided with an opening at its side for feeding ears of corn transversely into the path of the radial edge of said cutter, said casing being also provided with a horizontal slot in its upper side through which the peripheral cutter operates, a trough portion being formed on each side of said slot for the purpose of supporting an ear of corn tangentially and longitudinally in the path of said peripheral cutter.

WILBUR B. FOWLER.